Patented Nov. 8, 1927.

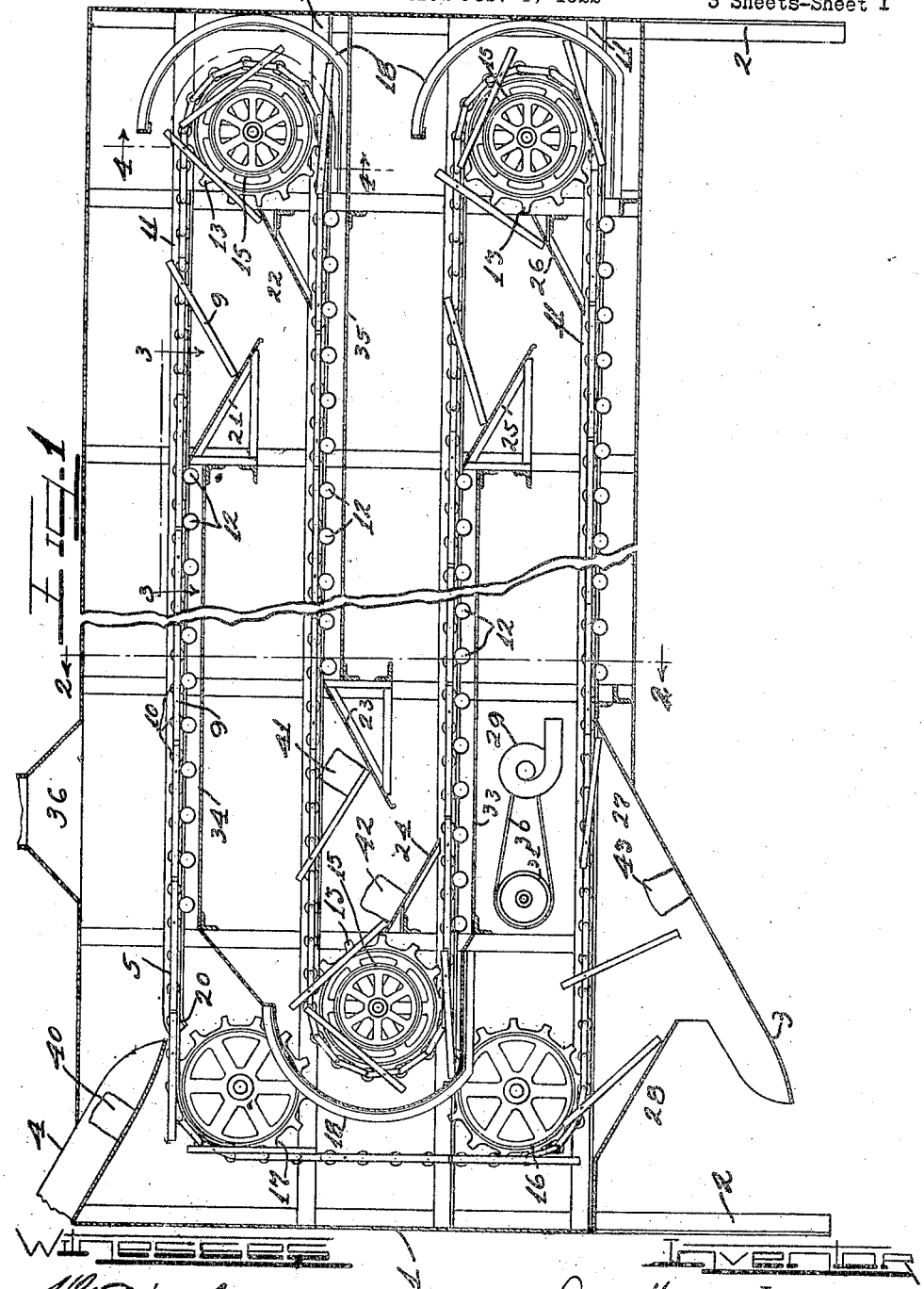

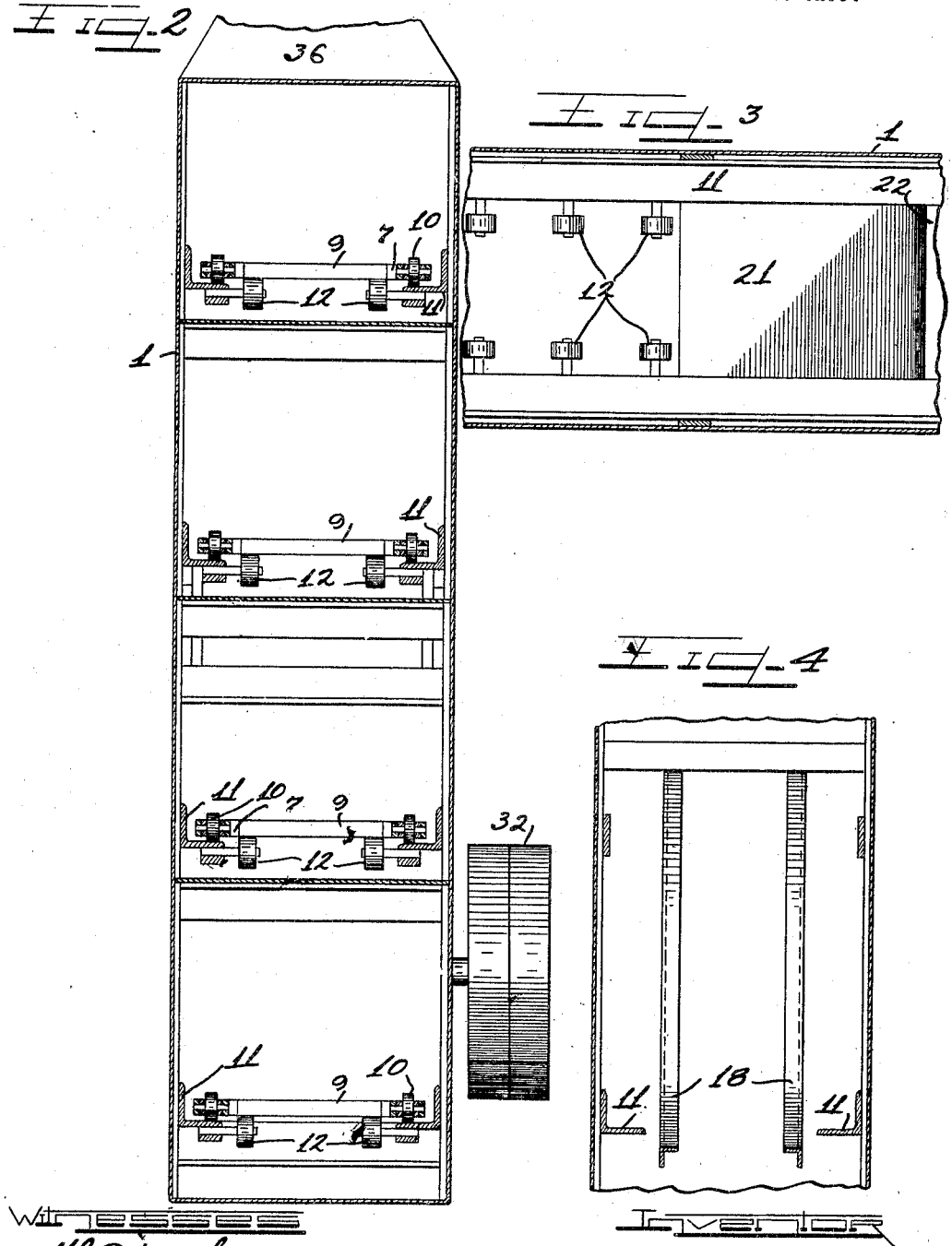

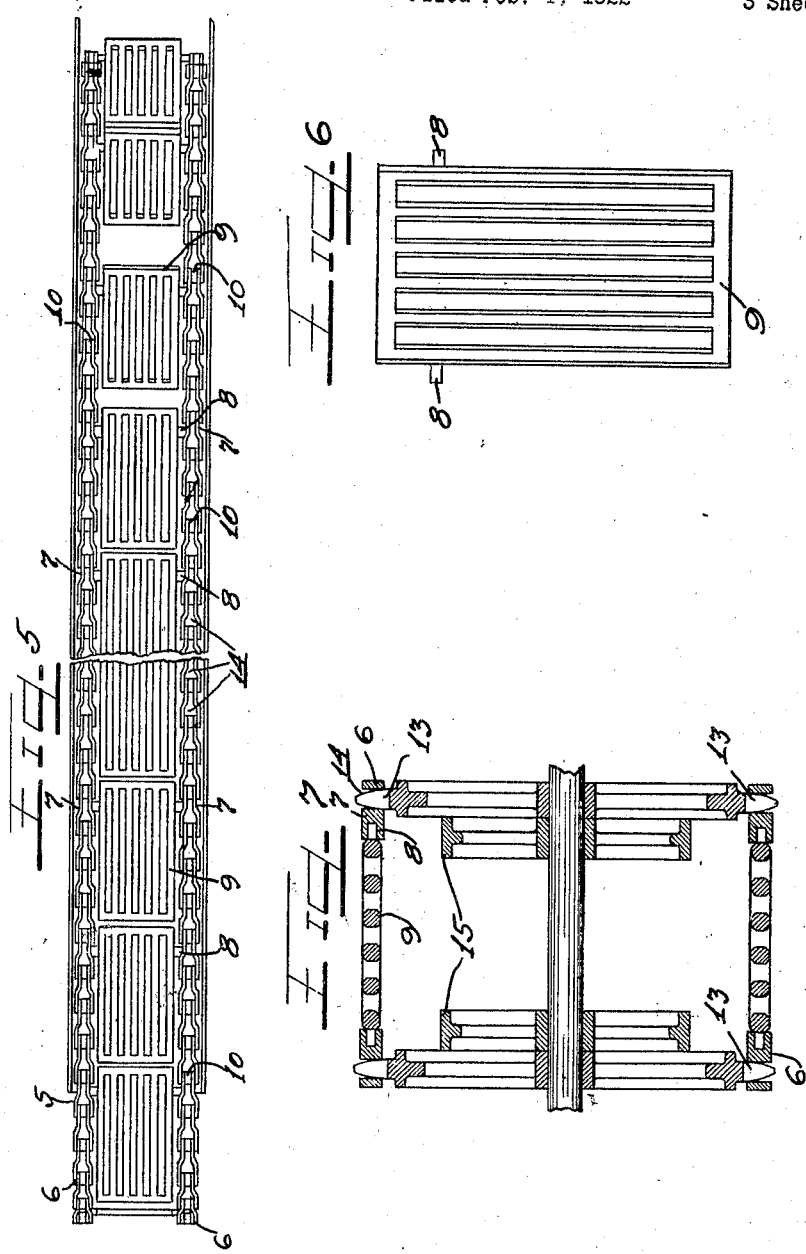

1,648,330

UNITED STATES PATENT OFFICE.

HAROLD J. SMITH, OF CHICAGO, ILLINOIS.

MACHINE FOR HANDLING, COOLING, AND DRYING MATERIALS.

Application filed February 4, 1922. Serial No. 534,112.

This invention relates to a machine for the treatment of bread as it comes from the oven. It is necessary that such bread be cooled and dried without being subject to any violent changes of temperature or humidity.

It is an object of this invention to provide a machine which shall accomplish this result without the use of any extravagant amount of floor space.

It is a further object of this invention to provide a conveyor which shall carry the bread back and forth at several different heights throughout the one casing.

It is a further object of this invention to provide a conveyor which shall be adapted to support the bread upon either face of the conveyor belt.

It is a further object of this invention to provide means for getting the bread from one level to the next without directly dropping it any very great distance.

It is a further object of this invention to provide a conveyor belt made with a plurality of swinging platforms which by tilting will deposit the bread at the proper places.

It is a further object of this invention to provide means for supporting said platform from tilting except at the points where it is desired that the bread leave the conveyor belt.

It is a further object of this invention to provide means for guiding the swinging platforms in the travel of the conveyor around the pulleys.

It is a further object of this invention to provide supports which shall contact the tilting platforms to gradually lower the bread to within a short distance of the level next beneath.

It is a further object of this invention to provide for a current of air which shall travel through the casing in a path having the same number of levels as the conveyor but in the opposite direction to the conveyor travel.

Other and further important objects of this invention will be apparent from the disclosures in the drawings and the specification.

The invention (in a preferred form) is illustrated in the drawings and hereinafter more fully described.

On the drawings:

Figure 1 is a longitudinal section of the machine.

Figure 2 is a section upon the line 2—2 of Figure 1.

Figure 3 is a section upon the line 3—3 of Figure 1 the conveyor being omitted.

Figure 4 is a section upon the line 4—4 of Figure 1.

Figure 5 is a top plan view of a stretch of conveyor belt.

Figure 6 is a detail plan view of one of the tilting platforms.

Figure 7 is a section showing in detail one of the drums which convey the conveyor belts from one level to the next.

As shown on the drawings:

The machine includes a casing 1 suitably supported upon legs 2 at a height that will provide for the delivery of the bread from the chute 3. Bread is received from the oven through a chute 4 at one upper corner of the machine. This chute deposits the bread upon a conveyor 5. This conveyor is of the endless belt type, the belt comprising two chains 6 and the platforms 9 connected thereto. At regular intervals along these chains there are links 7 having bosses provided with recesses to receive lugs 8 by which the platforms 9 are supported. These platforms are in the form of rectangular grates or girds so that they contact with but a limited surface of the bread. Their open structure also affords ready passage for air so that all surfaces of the bread are exposed to the surrounding air while the longitudinal disposition of their bars, as shown, facilitates the discharge of the load. The chains also have rollers 10 which rest upon guiding angle irons 11. From the under side of these angle irons are supported rollers 12 by which the platforms 9 are held in a horizontal position.

The conveyor belt 5 is led about drums at each end of each level of the machine. As illustrated in the drawings, there are four levels in the machine and, consequently, five such drums. The drums include sprocket wheels, with teeth 13 which enter into the open spaces 14 in the chains 6. Beside each sprocket wheel, there is a pulley 15 of smaller diameter which supports the platforms 9 as they go around the drum. Two of the sprocket wheels, one for each chain 6, and two of the smaller pulleys, all on one shaft, go to constitute a drum and are arranged at each point where the belt passes from one level to the next and the conveyor belt goes around them.

The two sets of sprocket wheels 16 and 17 at the two ends of a vertical portion of the conveyor belt, where it goes from the bottom to the top level, do not need the smaller pulleys and as illustrated in Figure 1, the smaller pulleys are omitted there. Around each of the drums except these two is placed a curved guard 18. At the left hand end of the upper level, the angle iron 11 is turned downward at the end 20 of the iron in order to more readily receive the rollers 10 as they come from the sprocket wheel 17.

Near the right-hand end of the same level, the rollers 12 are omitted. Beginning adjacent the last roller 12, there is a contents lowering support 21 which slopes downward and to the right. Below this support and further to the right so as to be closely adjacent to the drum at the right-hand end of the first level is a support 22 which slopes down and to the left.

Similarly at the left-hand end of the second level, the rollers 12 are omitted and lowering supports 23 and 24 are supplied. At the right-hand end of the third level, a similar arrangement with the supports 25 and 26 is provided. At the left-hand end of the bottom of the machine, the rollers 12 are omitted and a contents lowering support 27 is provided which merges into the chute 3. Further to the left, so as to be directly under the sprocket wheel 16 is a platform 28 which slopes downward and to the right and delivers to the chute 3.

Immediately over the lowering support 27 is a blower 29 driven by a belt 30 from a pulley 31. The pulley 31 and the several sprocket wheels are driven from a main drive pulley 32 by connections which do not constitute any part of my invention and are not described in detail and not illustrated.

The air from the blower 29 is prevented from going immediately upward by a partition or baffle plate 33 which extends to the left as far as the guide 18 and at that point passes around the drum at the left-hand end of the second and third levels and merges with the baffle plate 34 between the first and second levels. The baffle plate 33 extends to the right as far as the support 25. A baffle plate 35 just below the second level of the machine extends from the right-hand end of the machine to the support 23. A funnel-shaped stack 36 at the top of the machine affords an outlet for the air supplied from the fan 29.

In the operation of the machine, bread is delivered from the chute 4 as indicated by the loaf 40 and deposited upon the upper face of the belt of the conveyor 5. This conveyor is moving toward the right at this point, and the bread is carried by it until the point is reached where the rollers 12 are omitted. The platform 9 upon which the bread rests being no longer supported by the rollers 12 will tilt about its pivoted end and its left-hand end will rest upon the lowering support 21. As the conveyor moves to the right, the end of the platform 9 will go lower and lower and the platform will become steeper and steeper. The loaf of bread therefore will slide down the platform 9 or down the platforms 9 and 21 and drop from the lower ends of them to the second level.

It may happen that there is a loaf already at the lower end of the support 21 or that two or more loaves are on the support 9 when it arrives at support 21 and one of them in getting onto support 21, gets in the way of the other. Again it may happen that a loaf adheres to platform 9 and will not slide off at the steepness which platform 9 has while in contact with 21. In any of these cases, the bread will be deposited upon support 22 when the platform 9 leaves support 21 and swings by gravity to a nearly vertical position. The lower end of the platform 9 comes into sharp contact with support 22 because of this swing combined with the motion of the belt toward the right. The jar of this contact is sufficient to dislodge any loaf that has continued to stick to platform 9.

On the second level, the bread is in contact with the opposite face of the conveyor from that which it occupied during the journey across the first level. When the left-hand end of the second level is reached, the bread travels down the support 23 or 24 in the way already described. The loaf 41 indicates the way that most of the bread would travel, but if a loaf should continue to stay on the platform 9 until it hits the support 24, the loaf would then be delivered upon the support 24 as illustrated by the loaf 42. From the supports 23 or 24, the bread is delivered to the third level of the conveyor belt and rides upon the same face of the belt as during its first journey. The bread again descends at the supports 25 and 26, and arrives at the support 27 after its journey across the bottom of the machine.

As the lower level of the conveyor belt travels from the edge of support 27 toward the left, the platform 9 will become more and more steep until finally the bread slides from it unto the support 27 as indicated by the loaf 43. The bread will slide down this support into the chute 3 and so out of the machine. If the bread should stick to the platform 9, it will be shaken off therefrom when this platform hits the oblique support 28, which would deliver it to the chute 3.

After the conveyor has reached this point, it returns to the point of starting by the vertical passage at the left of the machine. No guides or supporting collars are needed for the platforms 9 in this part of the belt because they hang by gravity in the same plane as the chains 6.

The air delivered by the fan 29 meets the bread at the left of the lower level when the bread is nearly cool and dry. The air which is thus delivered is at nearly the same temperature as this bread and so introduces no abrupt change in the temperature of the bread. This air must travel along the lower level of the machine to the right-hand end thereof; then it may pass up between the support 25 and the right-hand end of the machine, but the baffle plate 35 then compels it to travel nearly to the left-hand end of the machine. It then passes to the space above the second level. There the baffle plate 34 again leads it to the right-hand end of the machine. It then travels to the left and emerges through the stack 36. A very little air may go from the fan 29 toward the left and up the end of the machine where the conveyor belt is vertical. As most of this passageway is stopped by the chute 4 only a little air can go in this direction and the great mass of air travels in the path already described.

During all of this journey, the air travels from bread which is comparatively cool toward bread which is hotter and the air becomes heated in the act of cooling the bread. Air which arrives at the left-hand end of the top of the machine is therefore hot and has absorbed much moisture from the bread it has already passed. It will therefore cause no abrupt change in conditions of either heat or moisture for the bread which arrives in the machine from the chute 4. The change from this point to the mouth of the fan 29 is a gradual one and the bread is therefore gradually cooled and but slightly dried.

I am aware that numerous details of construction may be varied through a wide range without departing from the principles of this invention, and I therefore do not purpose limiting the patent granted otherwise than necessitated by the prior art.

I claim as my invention:

In a conveyor belt, a pair of conveyor chains, gratings pivotally connected at their forward portions to said chains, said gratings being provided with bars extending substantially parallel with the line of travel of the chains, and means supporting the rear portions of said gratings and holding them during their travel normally substantially level but permitting them to tilt to discharge their loads when the gratings reach a predetermined position in their travel, the lengthwise disposition of the bars of the gratings facilitating the discharge of the load when any grating is in an inclined position.

In testimony whereof I have hereunto subscribed my name.

HAROLD J. SMITH.